(12) United States Patent
Durdu Aydin et al.

(10) Patent No.: US 11,802,051 B2
(45) Date of Patent: Oct. 31, 2023

(54) LITHIUM RECOVERY FROM BORAX DILUTE SOLUTIONS

(71) Applicant: Eti Maden Isletmeleri Genel Mudurlugu, Ankara (TR)

(72) Inventors: Aysun Durdu Aydin, Ankara (TR); Hasan Can, Ankara (TR); Melike Yildiran Serin, Ankara (TR); Fazli Cabbar Metin, Ankara (TR); Derya Maraslioglu, Ankara (TR)

(73) Assignee: ETI MADEN ISLETMELERI GENEL MUDURLUGU, Ankara (TR)

( * ) Notice: Subject to any disclaimer, the term of this patent is extended or adjusted under 35 U.S.C. 154(b) by 587 days.

(21) Appl. No.: 17/066,684

(22) Filed: Oct. 9, 2020

(65) Prior Publication Data
US 2021/0107788 A1 Apr. 15, 2021

(30) Foreign Application Priority Data
Oct. 11, 2019 (TR) .................. 2019/15707

(51) Int. Cl.
*C01B 25/30* (2006.01)
*C01D 15/08* (2006.01)
*B01D 9/00* (2006.01)
*B01D 3/00* (2006.01)
*B01D 37/00* (2006.01)

(52) U.S. Cl.
CPC .......... *C01B 25/308* (2013.01); *B01D 9/0018* (2013.01); *B01D 37/00* (2013.01); *C01D 15/08* (2013.01); *B01D 2009/0086* (2013.01)

(58) Field of Classification Search
CPC ..... C01B 25/308; C01B 25/30; B01D 9/0018; B01D 37/00; B01D 2009/0086; B01D 9/02; C01D 15/08; C01D 15/00
See application file for complete search history.

(56) References Cited

U.S. PATENT DOCUMENTS
2015/0197830 A1   7/2015 Chon et al.

FOREIGN PATENT DOCUMENTS
WO   2013036983 A1   3/2013

*Primary Examiner* — Timothy C Vanoy
(74) *Attorney, Agent, or Firm* — Bayramoglu Law Offices LLC

(57) ABSTRACT

An improved method of lithium recovery from borax dilute solution is provided. In this method, boron in the borax dilute solution is removed from the medium as borax decahydrate and while this removal process is carried out, liquid-liquid extraction with organic sedimentary chemicals or ion exchange resins are not used.

1 Claim, No Drawings

LITHIUM RECOVERY FROM BORAX DILUTE SOLUTIONS

CROSS REFERENCE TO THE RELATED APPLICATIONS

This application is based upon and claims priority to Turkish Patent Application No. 2019/15707, filed on Oct. 11, 2019, the entire contents of which are incorporated herein by reference.

TECHNICAL FIELD

The invention is related to an improved method of lithium recovery from borax dilute solutions.

The method of the invention involves the production of the lithium source in the borax dilute solution as lithium compounds. While performing lithium recovery, borax decahydrate in dilute solution is removed from the dilute solution medium.

BACKGROUND

Due to its high energy density, low mass and other environmental and performance characteristics, lithium is widely used both in portable electronic devices in the secondary (rechargeable) battery industry and as a power supplier in vehicles.

Although it is not one of the main components of glass production, the lithium minerals used in glaze production in the glass and ceramic industry increase the fluidity and provide the opportunity to run at a lower oven temperature. Lithium gives more fluidity than its equivalent materials. Glass producers obtain high strength materials with resistance to impacts by using lithium in their beaker and bottle glass production.

When lithium is used in aluminum production, the damage caused by fluorine to the environment is reduced. In addition, due to the decrease in temperature and viscosity, the life of the platinum screens used in production is prolonged.

Lithium compounds are also used in oil and grease production; during the production of organometallic compounds; in the treatment of mental problems, they are frequently used materials especially in "manic-depressive psychoses", "bipolar personality disorders", worldwide.

Lithium compounds obtained from concentrates of lithium minerals and brine (predominantly lithium carbonate ($Li_2CO_3$) and lithium hydroxide (LiOH)) are used as a raw material in various sectors of the industry. Lithium carbonate production carried out with other products from brine. The production method (process) from brine is both easier and cheaper than mining (rocks and minerals) methods. For this reason, production made from brine has a very high share in the production of lithium compounds in the world. Almost all of the lithium production from brine is obtained from the salt waters within the borders of Bolivia, Argentina and Chile known as the "Lithium Triangle".

In the production in Chile, lithium-containing brine is pumped from 30 m deep wells and the ion concentration is increased by performing evaporation with solar energy. Then the sulfate ion is allowed to precipitate as gypsum. After the precipitation of magnesium, potassium and sodium as chloride, concentrate lithium-containing brine is obtained at higher concentrations by thickening and centrifugation method. In this way, the lithium content of the brine has been increased up to 4-6%, and it contains boron and magnesium as impurities. Before $Li_2CO_3$ is precipitated, boron is removed. Magnesium is separated from the process by a two-stage precipitation process made with lime and soda ash.

$Li_2CO_3$ is precipitated by reacting highly purified brine with saturated soda ash ($Na_2CO_3$) solution. Although the magnesium/lithium ratio of the lake in Chile is 6.4, the process is very economical since the lithium content is very high and evaporation is easily achieved due to the dryness of the region. Again, the boron salts separated during lithium production from this brine are then reacted with sulfuric acid, and as a result boric acid ($H_3BO_3$) is obtained.

In the international patent document WO2013036983A1, a method developed for preparing lithium carbonate from concentrated lithium brine that can be used for battery class, pharmaceutical and other high purity applications is mentioned. In the relevant patent document, lithium-containing salt waters were concentrated by firstly evaporation under the sun (solar evaporation). Next, impure lithium carbonate was precipitated by adding $Na_2CO_3$. Impure lithium carbonate was then converted to high resolution $LiHCO_3$ by reacting again with $CO_2$ under the pressure of 0.7-20 atm in the range of $-15°$ C. and $40°$ C. In the next step, the insoluble impurities were separated by filtration. Resins were used to remove the remaining dissolved boron and other metal impurities (Ca, Mg, Fe). Finally, lithium bicarbonate was converted into $Li_2CO_3$ and precipitated with a minimum purity of 99.6%.

In the U.S. patent document US2015197830A1, the method of obtaining lithium from a solution containing lithium is mentioned. The method of the invention includes the steps of separating the lithium-containing solution into a solution containing a monovalent ion, removing foreign substances from the solution containing a monovalent ion, precipitating the lithium phosphate dissolved in the solution containing the monovalent ion by adding a material providing phosphorus to the solution containing monovalent ion.

In view of the lithium recovery methods examined, it was found necessary to develop a lithium recovery method in which boron in a dilute solution is removed from the medium as borax decahydrate and liquid-liquid extraction with organic sedimentary chemicals or ion exchange resins is not used while performing this removal process.

SUMMARY

The object of this invention is to realize a lithium recovery method in which boron in borax dilute solution is removed from the medium as borax decahydrate.

Another object of this invention is to perform a lithium recovery method in which liquid-liquid extraction with organic sedimentary chemicals or ion exchange resins is not used while boron in a dilute solution is removed from the medium as borax decahydrate.

DETAILED DESCRIPTION OF THE EMBODIMENTS

According to the invention, the method of lithium recovery from borax dilute solutions comprises reducing the solution containing 200-400 ppm $Li^+$ (dilute solution) to 20-50% of its initial volume by evaporation, filtering the concentrate solution obtained as a result of evaporation and removing the borax decahydrate from the medium by cooling down to below $25°$ C., after the borax decahydrate is removed from the medium, filtering the impurities in the medium by bringing the pH value of the solution to 10.5-12 level, filtering the turbidity containing impurities that is obtained by reheating the solution, from which large amounts of boron and impurities have been removed, then obtaining lithium carbonate ($Li_2CO_3$) with a purity of about 70% by reducing it to 4-8% of its initial volume by evaporating the solution for the 2nd time, obtaining $Li_2CO_3$ with a purity over 99% by using deionized water (alternatively, alcohol) over 90° C., precipitating lithium phosphate ($Li_3PO_4$) by adding phosphate source (sodium phosphate dodecahydrate ($Na_3PO_4.12H_2O$)) to the medium for recovering a significant amount of lithium remaining in the solution, synthesis of lithium phosphate ($Li_3PO_4$) with a minimum purity of 70% precipitated at a temperature above 80° C.

The dilute solution used in the method of the invention contains lithium as well as borax. The efficiency will be increased by incorporating the dilute solution to the production of borax decahydrate by taking the borax decahydrate in this solution and keep it in the dams. In addition, a study was carried out to meet the industrial lithium demands with domestic resources by synthesizing lithium chemicals. The lithium compounds to be produced as a result of this study will be usable in all sectors where lithium is used. Further, the amount of water consumed in factory productions where groundwater is used will decrease considerably with the anticipated evaporation and feedback to the system. This is an economical and environmentally friendly approach.

When the production methods of lithium compounds are examined around the world, it is seen that production is made from salt water (brine) or mineral resources such as spodumene. However, when the production methods are examined in detail for economical reasons, brine comes into prominence and is used as raw material in almost all of the production of lithium compounds. The concentration of lithium therein is increased by naturally subjecting the brine to evaporation.

To produce lithium carbonate, the lithium is converted from the chloride form to the carbonate form by adding soda ash ($Na_2CO_3$). In the method known as the traditional method, the recovery of lithium is around 50%. The production process varies between 8-36 months depending on weather conditions. For this reason, there are bottlenecks in sudden demand increases.

In addition, when the current production processes are examined, no production is observed with the solution with high boron content as we use in our studies. In the said production processes, organic solvents are used to obtain the boron from the medium and boric acid synthesis is carried out as the final product. In the method of the invention, while lithium is obtained, the boron in the medium is removed from the medium as borax decahydrate.

The ratios of Mg/Li and Ca/Li should be low in the production using the traditional method. As these rates increase, the chemical cost required for removing calcium (Ca), lithium (Li) and magnesium (Mg) from the medium increases and the economics of the process disappears. Also, the increase of the ratio of $SO_4$/Li causes the lithium to be removed from the medium as sulphate salts during the formation of lithium concentrated solution and decreases the lithium recovery efficiency. Therefore, it may be necessary to remove the sulphates in the medium before the lithium compounds are obtained.

In view of the drawbacks of the traditional methods, it is desired to produce lithium from the borax dilute solution in the method of the invention.

When calcium chloride ($CaCl_2$) or calcium hydroxide ($Ca(OH)_2$) is used for sulphate ($SO_4$) removal as in traditional methods, economically valuable sodium borates, which are high in the medium, can be converted into less valuable calcium-containing borates.

Lime and soda ash used in the traditional method of removing Mg and Ca from the medium will form less valuable borates with calcium and magnesium content in the borax dilute solution.

If the high boron content in the borax dilute solution is taken with organic solvents as in traditional methods, both the costs will increase and the risk of organic impurities contaminating the borax production process will occur.

With the method of the invention, lithium compounds needed by the industry can be synthesized from domestic sources. In addition to this, boron and water in the solution that are surplus in factories will be returned to the system. With the proposed method, the recovery of lithium can be increased from the 50% level in the traditional method of precipitation to over 85%. Unlike the current methods, sodium borate compounds are also produced in addition to lithium production instead of boric acid.

Accordingly;

Within the scope of this invention, the borax dilute solution is reduced to 20-50% of its initial volume, and is filtered and cooled down to below 25° C. The ratio of 20-50% of the initial volume is important, because the lithium in the medium should not dragged with boron during crystallization. Thus, the borax decahydrate therein is removed from the medium and the buffer effect of the borax in the medium is gradually reduced.

After the borax is removed from the medium, the impurities in the medium are removed by bringing pH value of the solution to 10.5-12 level. Here, the absence of filtration prevents core crystallization of borax in the form of the decahydrate and its precipitation. The high boron content that will be present in the medium due to the non-precipitated decahydrate also prevents crystal nucleation of lithium carbonate, and thus, lithium carbonate cannot be produced.

It has been found that there is no need to add any chemical to the medium when the pH value is within the specified range above. The reason for this is the effect of sodium carbonate in solution, which is used in our borax production

TABLE 1

The content of the dilute solution used in the method of the invention

| | $Li^+$ (mg/L) | $K^+$ (mg/L) | $Mg^{+2}$ (mg/L) | $Ca^{+2}$ (mg/L) | $SO_4^{-2}$ (g/L) | B (g/L) | $Na^+$ (g/L) | Mg/Li | $SO_4$/Li | Ca/Li | B/Li |
|---|---|---|---|---|---|---|---|---|---|---|---|
| Dilute Solution | 200-400 | 200-1200 | 10-800 | 25-150 | 1.4-3.5 | 2.9-46.6 | 4.4-60 | 0-4 | 3.5-17.5 | 0-0.4 | 7.3-233 | process, on pH. When adjusting the pH, if necessary, sodium hydroxide (NaOH) or sodium carbonate ($Na_2CO_3$) can be used. By adjusting the pH, impurities such as calcium (Ca), magnesium (Mg) and strontium (Sr) in the medium can be substantially removed from the medium as solids.

The turbidity containing impurities occurs by reheating the solution, of which large amounts of boron and impurities have been removed, and then the turbid solution is filtered. Then lithium carbonate ($Li_2CO_3$) is obtained from the filtrate with a purity of about 70% by evaporating the filtrate to 4-8% of its initial volume. If there is more or less evaporation level, the desired lithium recovery rate and lithium carbonate purity cannot be achieved. Following this, $Li_2CO_3$ is obtained with a purity over 99% by using deionized water (alternatively, alcohol) over 90° C. The final evaporation level determined is such that the sulfates in the medium will not affect the lithium recovery.

In order to remove the lithium carbonate, which remains soluble in solution and does not precipitate, from the medium, re-evaporation cannot be performed due to other components ($SO_4$, B, Na, $CO_3$) in the medium. Thus, lithium phosphate ($Li_3PO_4$) was precipitated by adding phosphate source ($Na_3PO_4.12H_2O$) to the medium for recovering a significant amount of lithium remaining in the solution. $Li_3PO_4$ which was precipitated at a temperature above 80° C. has a minimum purity of 70%.

In this context, at least 85% of the initial lithium content is recovered, which is higher than the recovery percentage achieved with conventional methods (about 50%).

To summarize the benefits to be obtained by the method used in this invention:

Economically valuable boron in the dilute solution will be recovered. Thus, the efficiency in the borax factories will increase.

Unlike the production methods in the world, lithium compounds with high economic value will be synthesized with a method specific to domestic resources so that external dependence will be reduced. For the first time in our country, the production of industrial scale lithium compounds can be carried out within this scope.

The storage area of the dilute solution will be reduced, thereby reducing the expenditure on artificial ponds that incur increasing high costs.

The water used in factories will be reused so that the damage to the environment due to excessive water usage will be minimized.

At least 85% of the lithium content in the dilute solution was removed from the medium as lithium compounds, thus exceeding the rate (50%) in traditional methods.

What is claimed is:

1. A method of recovering lithium from a borax dilute solution, comprising the following steps:

reducing the solution containing 200-400 ppm $Li^+$ (dilute solution) to 20-50% of its initial volume by evaporation, filtering the concentrate solution obtained as a result of evaporation and removing the borax decahydrate from a medium by cooling down to below 25° C., after the borax decahydrate is removed from the medium, filtering the impurities in the medium by bringing the pH value of the solution to 10.5-12 level, reheating the solution, from which boron and impurities have been removed to obtain a turbid solution, then filtering the turbid solution, then obtaining lithium carbonate ($Li_2CO_3$) with a purity of about 70% by reducing it to 4-8% of its initial volume by evaporating the solution for the 2nd time, obtaining $Li_2CO_3$ with a purity over 99% by dissolving in deionized water (alternatively, alcohol) at a temperature over 90° C., precipitating lithium phosphate ($Li_3PO_4$) by adding a phosphate source to the medium at a temperature above 80° C. for recovering the lithium remaining in the solution.

* * * * *